United States Patent [19]
Alves et al.

[11] Patent Number: 5,535,314
[45] Date of Patent: Jul. 9, 1996

[54] VIDEO IMAGE PROCESSOR AND METHOD FOR DETECTING VEHICLES

[75] Inventors: James F. Alves, Camarillo; Gerry R. Cacnio, Los Angeles; David R. Stevens, Simi Valley, all of Calif.

[73] Assignee: Hughes Aircraft Company, Los Angeles, Calif.

[21] Appl. No.: 787,200

[22] Filed: Nov. 4, 1991

[51] Int. Cl.⁶ .................................................... G06T 7/40
[52] U.S. Cl. ............................................................ 395/131
[58] Field of Search ................................. 395/131, 132, 395/133; 382/17, 18

[56] References Cited

U.S. PATENT DOCUMENTS

| | | | |
|---|---|---|---|
| 4,812,904 | 3/1989 | Maring et al. | 358/107 |
| 4,847,772 | 7/1989 | Michalopoulos et al. | 364/436 |
| 5,093,871 | 5/1992 | Klein et al. | 382/51 |

FOREIGN PATENT DOCUMENTS

| | | | |
|---|---|---|---|
| 222981 | 7/1985 | Japan | 382/17 |
| WOA9208215 | 5/1992 | WIPO . | |

Primary Examiner—Heather R. Herndon
Attorney, Agent, or Firm—Charles D. Brown; Wanda Denson-Low

[57] ABSTRACT

A video image processor (100) for processing video images performing the steps of generating video images (103) with a multi-spectral video source (102), converting analog color data contained in the generated video images (103) to digital color data for subsequent signal processing, extracting the digital color data from designated areas of the generated video images and utilizing the extracted digital color data for identifying a color distinguishable from a background color. Thus, the video image processor (100) processes the generated video images and has an intrinsic immunity to the effects of shadows by exploiting multi-spectral color information to distinguish, for example, a passing vehicle from the roadway 116. In a preferred embodiment, the video image processor (100) includes a multi-spectral video source (102) for generating the video images. A color digitizer (104) is employed for converting the analog color data contained in the generated video images to the digital color data for the subsequent signal processing. Then, a digital signal processor (106) is employed to extract the digital color data from the designated areas of the generated video images. Finally, a central processing unit (108) utilizes the extracted digital color data to identify a color distinguishable from the background color.

20 Claims, 5 Drawing Sheets

VIDEO IMAGE PROCESSOR AND METHOD FOR DETECTING VEHICLES

BACKGROUND OF THE INVENTION

1. Field of the Invention

The present invention relates to image processing systems. More specifically, the present invention relates to image processing techniques for vehicle detection.

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof and additional fields in which the present invention would be of significant utility.

2. Description of the Related Art

Traffic management has become a major priority for city and state governments. Transportation departments are assigned the task of designing traffic control systems which manage traffic flow in an efficient and safe manner. In order to accomplish this task, data must be accumulated which permits the traffic engineer to design and install the most appropriate control system. Accumulation of reliable data which is useful to the traffic control system designer is an absolute necessity.

An example of such data includes accurate counts of the number of vehicles passing through a designated detection point on the roadway. Several methods have been devised to assist the traffic engineer in obtaining accurate vehicle counts. One method involves the use of underground induction loops buried in the roadway. During operation, a vehicle generates an electromagnetic field. When the vehicle passes through the detection point, the induction loop buried in the roadway intercepts the electromagnetic field. An electrical voltage is then induced into the loop indicating the presence of a passing vehicle.

A second method for detecting and counting passing vehicles employs a pressure sensor which is secured in an orthogonal direction to the surface of the roadway. The pressure sensor can be, for example, pneumatic in nature. Passing vehicles contact the sensor and actuate a numerical counter mechanism.

Use of underground induction loops and surface mounted pressure sensors requires some modification to the roadway and periodic maintenance to ensure reliability. Further, use of the induction loop method necessarily requires that the detection points be immobile. Although utilizing the pressure activated device provides mobility, transporting and repositioning of the device is time consuming and inconvenient.

Yet a third method of surveying the number of passing vehicles at a detection point involves the use of electro-optical systems. In the past, such systems have utilized visible or infrared sensors. An example is a video camera which is focused upon a field of traffic and which generates video images. Once positioned and initialized, the camera can detect passing vehicles under the proper conditions without human intervention. Under computer control the collected video data has been known to be digitized, stored in memory and thereafter processed. It is known in the art that vehicle detection is possible by comparing the captured video image of the field-of-view with a standardized video image of the same field-of-view in the absence of vehicles. If the intensity information of the captured image is greater than the intensity information of the standardized image, a vehicle is detected. Further, other information can be derived and used for traffic control and surveillance.

Other electro-optical systems have been used to provide data characteristic of traffic conditions. One such system comprises a camera overlooking a roadway section which provides video signals representative of the field. A digitizer is included for digitizing the video signals and providing successive arrays of pixels characteristic of the field at successive points in space and time. A video monitor is coupled to the camera to provide a visual image of the field-of-view. With a terminal and a monitor, an operator can control a formatter to select a sub-array of pixels corresponding to specific sections in the field-of-view. A microprocessor then processes the intensity values representative of the selected portion of the field-of-view in accordance with spatial and/or temporal processing methods to generate data characteristic of the presence and passage of vehicles. This data can then be utilized for real-time traffic surveillance and control or stored in memory for subsequent processing and evaluation of traffic control conditions. Such an electro-optical system for detecting the presence and/or passage of vehicles can be found, for example, in U.S. Pat. No. 4,847,772 issued Jul. 11, 1989 to Michalopoulos et al.

In general, video images are captured and processed to determine if a vehicle has passed through a detection point. Traditional video image processors designed to detect vehicles typically employ mono-spectral cameras and rely entirely on intensity information changes as the basis of their image processing techniques. A mono-spectral camera generates a single-valued function for every pixel location appearing in the image. The single-valued function defines the amount of light sensed by the camera at that pixel location. The video image exhibits a spatial representation of the light energy distribution captured by the camera. An example of a mono-spectral camera is a black and white camera.

The intensity refers to the actual single value assigned to every position on the image where each single value is a function of the quantity of radiation sensed by the camera. An intensity profile is a one-dimensional function. For example, a line can be drawn across one lane of traffic on a video camera image. The intensity variations at various pixel positions along that line can be determined and utilized to generate an intensity profile. A graph can be generated by plotting the intensity of the pixel versus the position of the pixel along the line in the video image. In contrast, a color profile is a two-dimensional function. Therefore, for every position along the line, two numbers are defined which represent the color dimensions. The two numbers represent the hue dimension, indicated by the angle "$\Phi$", and the saturation dimension, indicated by the distance "R".

Unfortunately, certain problems continue to plague the conventional video image processor in the traffic assessment application. Two of these problems include differentiating shadows from vehicles and differentiating the rain spray associated with inclement weather from vehicles. Intensity changes alone can be a difficult basis for detecting vehicles for at least two reasons. The first reason is that the intensity profile of some vehicles may not significantly contrast with the intensity profile of the roadway. Second, vehicle shadows or rain spray moving through the detection point may possess enough contrast to trigger a false vehicle detection.

Thus, there is a need in the art for a video image processing system which is relatively immune to false vehicle detection caused by shadows and rain spray moving through the detection point. There is a further need for a system which is capable of distinguishing the vehicle from the roadway and which can be easily and inexpensively implemented with existing commercial hardware. The ideal system would be capable of deployment in both day and night operations, have dynamic detection points capable of being positioned anywhere on a video image, and use a parameter other than intensity for vehicle detection.

SUMMARY OF THE INVENTION

The need in the art is addressed by the video image processor and method for detecting vehicles of the present invention. The invention is a method for processing video images having the steps of generating video images with a multi-spectral video source and converting analog color data contained in the generated video images to digital color data for subsequent signal processing. The method further includes the steps of extracting the digital color data from designated areas of the generated video images and utilizing the extracted digital color data for identifying a color distinguishable from a background color. Thus, the invention provides a method for processing generated video images which has an intrinsic immunity to the effects of shadows by exploiting multi-spectral color information to distinguish, for example, a passing vehicle from the roadway.

In a preferred embodiment, a video image processor is employed having a multi-spectral video source for generating the video images. A color digitizer is employed for converting the analog color data contained in the generated video images to the digital color data for the subsequent signal processing. Then, a digital signal processor is employed to extract the digital color data from the designated areas of the generated video images. Finally, a central processing unit utilizes the extracted digital color data to identify a color distinguishable from the background color.

DESCRIPTION OF THE INVENTION

Figure 1:
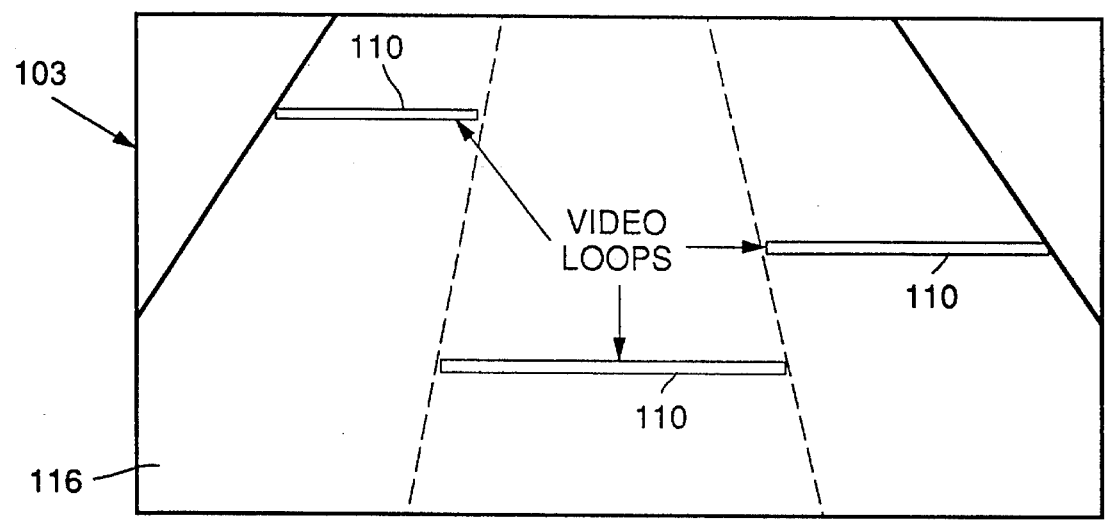
FIG. 1 is a video image of a traffic scene showing three traffic lanes of a roadway as seen in perspective on a video monitor having a video loop superimposed over the video image to detect vehicles.

As shown in the drawings for purposes of illustration, the invention is a method for processing video images and is embodied in a video image processor 100 of the type having a multi-spectral video source 102 for generating multi-spectral video images 103. The analog color data contained in the video images 103 is digitized, extracted from a designated area, and separated from intensity information and thereafter utilized to identify a color appearing in the video images distinguishable from an accumulated estimate of background roadway color data.

Electro-optical vehicle detection systems have been known in the past. In general, video images are captured and processed to determine if a vehicle has passed through a detection point. Traditional video image processors designed to detect vehicles typically employ mono-spectral cameras and rely entirely on intensity information changes as the basis of their image processing techniques. Unfortunately, certain major problems associated with video image processors of the past continue to exist. Two of those problems include differentiating shadows from vehicles and differentiating the rain spray associated with inclement weather from vehicles. Intensity changes alone can be a difficult basis for detecting vehicles for at least two reasons. The first reason is that the intensity profile of some vehicles may not significantly contrast with the intensity profile of the roadway. Second, vehicle shadows or rain spray moving through the detection point may possess enough contrast to trigger a false vehicle detection.

In accordance with the present invention, the multi-spectral video source 102 generates a plurality of multi-spectral video images 103 while a color digitizer 104 and a digital signal processor 106 cooperate to reduce the effects of shadows and rain spray by digitizing, extracting and separating from the intensity information, the color data contained in the generated video images 103. Further, the digitizer 104 and the processor 106 cooperate to significantly improve the detection of vehicles by comparing detected color changes within the generated video images 103 with an accumulated estimate of background roadway color data stored within a central processing unit 108. Detected color changes which are sufficient and consistent over time indicate the present of a vehicle. Moreover, the method for processing video images 103 is useful during both day and night operations, utilizes dynamic detection points which can be placed anywhere on the video image 103, is particularly immune to false vehicle detection caused by shadows and rain spray moving through the detection points, is capable of distinguishing the vehicle from the roadway and the processing steps are easily and inexpensively implemented with existing commercial hardware.

One of the novel aspects of the present invention is the extraction and analysis of multi-spectral information contained in the video signal generated by the video source 102 to accurately characterize and detect vehicles. In general, color can be defined by several different sets of parameters. In one method, color can be defined as a function of the parameters hue, saturation and intensity. The parameter hue identified by "Φ" differentiates between colors such as red, orange and blue while the parameter saturation identified by "R" measures the purity of color as compared to the color white. The parameter intensity identified by "Y" is the perceived magnitude (e.g., brightness) of the light.

In shadows, a substantial reduction in the intensity parameter occurs. However, the parameters of hue and saturation are independent of intensity. Therefore, the color parameters of hue and saturation can be utilized to detect objects, such as vehicles, while avoiding the problems associated with shadows and rain spray. An alternate method to define color is by referring to the brightness of the three primary colors red, green and blue. By adjusting the intensities and varying the superposition of the three primary colors, any color sensation can be generated. A color camera generates three numbers corresponding to the three primary colors. Thus, a color camera generates a red, green and blue (R,G,B) number from the red, green and blue spectrums for every position in the field-of-view. These three numbers characterize the colors of a scene at every position in the color camera field-of-view.

The video image processor 100 and the associated method employs a multi-spectral video source 102 such as a color video camera to monitor, for example, traffic flow conditions. From the information supplied by the color video image 103 of a traffic scene, the processor 100 can, without human intervention, complete the following tasks: count the number of vehicles passing through a detection point on a particular roadway lane over time; estimate the average velocity of vehicles; count the number of vehicles contained in or occupying a given length of roadway at any moment in time; and estimate the length of a vehicle as it travels along a roadway lane. Further, these tasks are performed in real-time. In this application, real-time refers to the collecting, processing and making decisions regarding information at the rate of sixty times per second. Thus, the processing of the information occurs as the information is collected. Further, the processor 100 is designed to employ off-the-shelf components to minimize cost and the amount of real-time computer resources necessary to detect vehicles utilizing digital color data.

Figure 2:
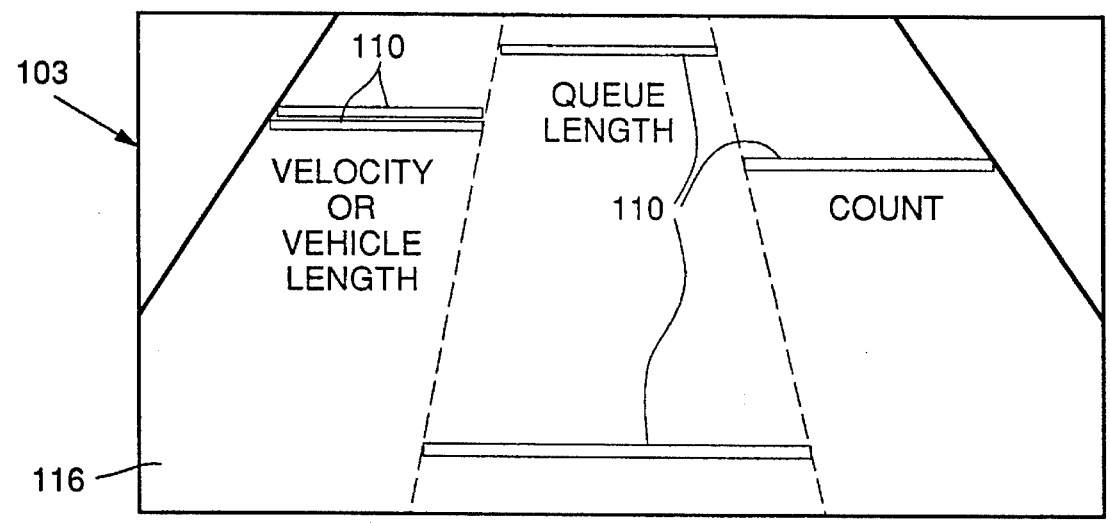
FIG. 2 is a video image of a traffic scene showing three traffic lanes of a roadway as seen on a video monitor in perspective illustrating the dynamic superposition of a plurality of video loops over the video image for performing several traffic monitoring functions.

The several traffic monitoring tasks require the ability to detect vehicles within specific areas on a multi-spectral video image 103. These areas are known as video loops 110. Each video loop 110 is an electronic loop superimposed on the video image 103 generated by the video camera 102. Each video loop 110 is superimposed over the video image 103 by employing the digital signal processor 106 and a video monitor 112 as described below. The superimposing of the video loop 110 onto the video image 103 does not change the video image produced by the camera 102. The function of each video loop 110 is to specify a designated area at which the presence of vehicles is to be detected. Each video loop 110 superimposed on a video image 103 within the color camera 102 is a small rectangular sub-image which is one traffic lane wide that lies perpendicular to the traffic flow as shown in FIGS. 1 and 2.

Figure 3:
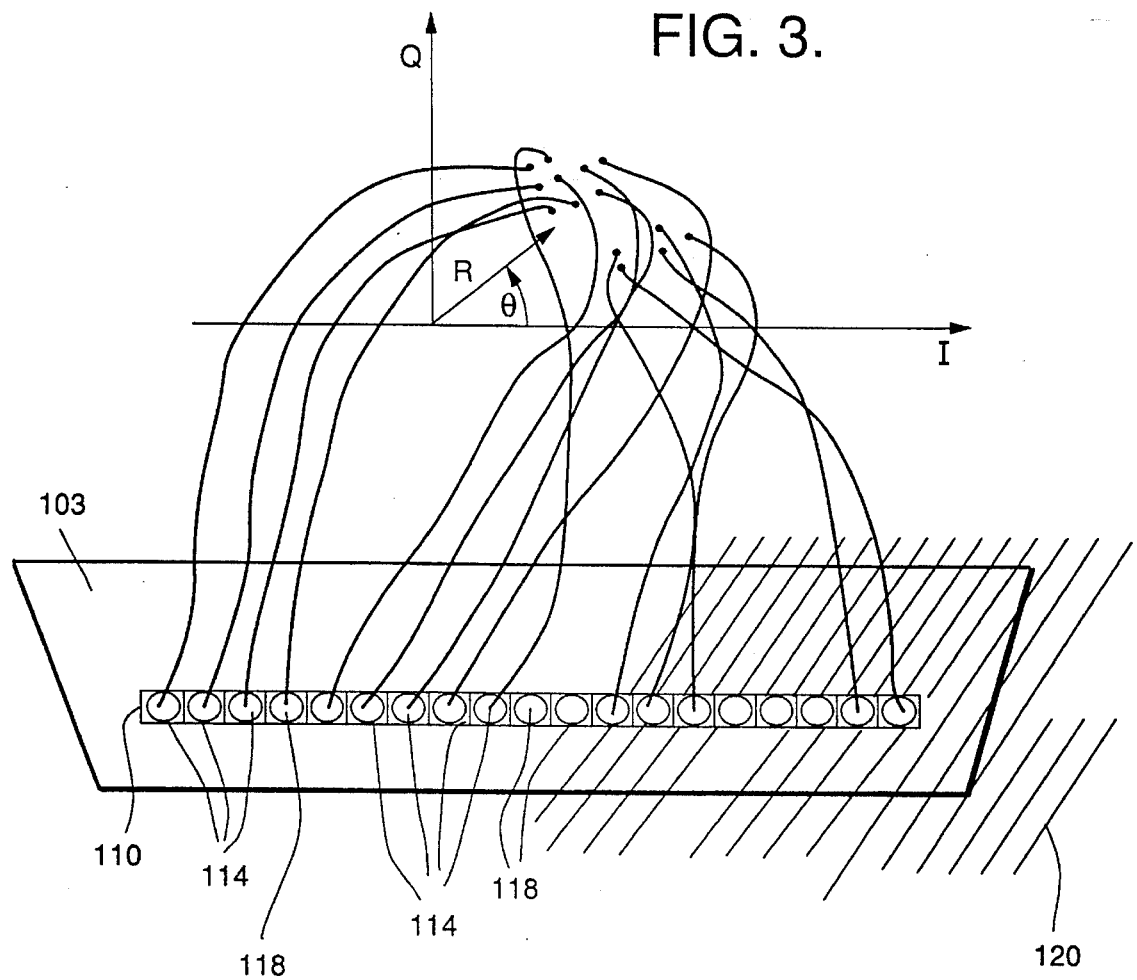
FIG. 3 is a diagram illustrating the mapping of individual pixels from a video loop superimposed over a traffic lane appearing on a video image to a two-dimensional color space having in-phase and quadrature-phase components.

By monitoring the changes in the color information (e.g., hue Φ, saturation R) at a video loop 110, the processor 100 determines if a vehicle located within the designated area on the roadway has passed through the video loop 110 superimposed onto the video image 103 of the designated area. The video loops 110 localize all processing to very small sub-areas 114 of the entire video image 103, substantially minimizing equipment requirements. The very small sub-areas 114 are shown in FIG. 3.

This process assumes that the video camera 102 has been placed above the roadway 116, such as on a light standard. The placement allows the gaps between vehicles to be imaged by the video camera 102. The length of a detectable inter-vehicle gap depends upon the height, depression angle, resolution and sampling rate of the video camera 102. With appropriate placement of video camera 102, the crux of the vehicle detection problem is the signal processing required to determine whether a vehicle or a road surface is imaged by the video camera 102 along a given video loop 110. Vehicle detection must be tolerant to weather conditions and to the effects of shadows moving through a video loop 110.

Assuming reliable vehicle detection with one video loop 110, multiple video loops can be dynamically placed to perform several traffic monitoring functions. One video loop orthogonally placed across a lane of traffic can generate a vehicle count over time. Two closely-spaced loops can be utilized to estimate average vehicle velocities by measuring the delay between the first and second video loop detection times. It is also necessary to know the physical distance between the video loops on the ground as compared to the loops drawn on the video image. Two closely-spaced video loops can also be utilized to estimate the length of a vehicle. Finally, two widely-spaced video loops 110 can be employed to measure queue length by counting how many vehicles enter and exit a given length of roadway as is shown in FIG. 2.

The method of processing multi-spectral video images 103 achieves reliable vehicle detection within a single video loop 110. One of the many advantageous features of the present invention lies in the information exploited and the signal processing employed to establish whether a vehicle or the roadway 116 occupies a video loop. The present invention exploits multi-spectral color information to distinguish vehicles from the roadway 116. When a vehicle is not present within a video loop 110, the color profile of the video loop characterizes the surface of the roadway 116. As a vehicle passes through the video loop, however, the color profile changes dramatically. Color provides the key to problems arising from the confusing effects of shadows or rain spray.

While vehicles tend to alter both color (R, Φ) and intensity (Y) information, shadows and rain spray tend to alter only intensity information (Y). Thus, the advantage of using color information stems from the fact that changes in color caused by shadows or rain spray are significantly lower in magnitude than changes in color caused by vehicles. For example, in the presence of a shadow, the intensity of each of the red, green, blue (R,G,B) numbers change since the brightness of the roadway is lowered. However, the perception of the color (e.g., the parameters hue Φ and saturation R) of the road does not appreciably change. Thus, during the presence of shadows or rain spray, the color profile (R1, Φ1) of the roadway will exhibit a dramatic difference from the color profile (R2, Φ2) of the object of interest such as a vehicle. The magnitude of the change of the parameters (R, Φ) depends upon the color of the car as compared to the roadway 116.

It has been discovered that changes in multi-spectral information can uniquely characterize road, vehicle or shadow imagery. Thus, color and intensity changes with respect to the profile of the roadway 116 are indicative of a particular condition. For example, a large and sudden change in color and/or intensity indicates to the central processing unit 108 that a vehicle is entering or exiting the video loop 110. The processing unit 108, by employing the combination of video loops 110, counts the vehicle, estimates the average vehicle velocity, the vehicle length and the queue length, if applicable. A sudden large drop in intensity accompanied by small changes in color indicates to the processing unit 108 that a shadow is entering or exiting the video loop 110. However, small or non-existent changes in color and intensity indicate a vacant video loop. Thus, vehicle detection is accomplished by successfully identifying those color changes indicative of true vehicle presence.

Each video loop 110 superimposed on the video image 103 represents a stretch of the roadway 116. It is noted that every point in the designated area of the video loop is divided into sub-areas 114. Each sub-area 114 is assigned a color parameter (Ri, Φi) by averaging the data from each sub-area such that there is a plurality of (R, Φ) values associated with the designated area of each video loop 110. Therefore, when a vehicle passes through the video loop 110, several of the plurality of (R, Φ) values will deviate from the (Ri, Φi) values of the roadway 116. Significant deviation indicates the presence of a vehicle.

Within each sub-area 114, there is a dot that corresponds to a picture element (pixel) 118 as shown in FIG. 3. Each pixel 118 represents a small portion of the video image 103 and the number of pixels is dependent upon the resolution size of the multi-spectral video sensor (video camera) 102. Each pixel 118 has a color R,G,B value associated therewith which is generated by the video camera 102. The R,G,B values generated by the camera are then transformed into National Television Standards Committee (NTSC) YIQ values. In this color encoding scheme, the "Y" value represents intensity while the in-phase (I) and quadrature (Q) components define a two-dimensional color space.

The hue (Φ) and saturation (R) parameters having R,B,G values are then mapped into the IQ color space as shown in FIG. 3. It is noted that the intensity information "Y" is eliminated and thus is not utilized for detecting the presence of vehicles. The video image 103 discloses a portion of the roadway 116 in shadows designated by the numeral 120. Shadows cause a large change in intensity information "Y" but only a small shift in IQ color coordinates. Thus, in the IQ color space, shadows and rain spray have little effect on the IQ color coordinates. This is the main reason why color was selected to detect the presence of vehicles.

Each of the pixels 118 shown in the video loop 110 in FIG. 3 is mapped into the IQ color coordinate space. Note that the pixels 118 mapped from the non-shadowed area of the video loop tend to congregate in a first section while the pixels mapped from the shadowed area of the video loop tend to congregate in a second section. These first and second sections which define the locus of pointed mapped from the non-shadowed and shadowed areas, respectively, in FIG. 3 are more clearly illustrated in FIG. 4. The first section representing the pixels 118 of the non-shadowed area of the video loop 110 represents sunlit road colors and includes an area boundry or threshold designated by the numeral 122. The second section representing the pixels 118 of the shadowed area of the video loop 110 represents road-in-shadow colors and also includes an area boundry or threshold designated by the numeral 124. The thresholds 122 and 124 are used to define changes in the I and Q color coordinate values of FIG. 3. These thresholds are dynamically established by a road color tracker in the central processing unit 108 described hereinbelow.

The sunlit road colors bounded by the threshold 122 represent the colors reflected from the surface of the roadway 116 in direct sunlight. The road-in-shadow colors bounded by the threshold 124 represent the colors reflected from the surface of the roadway 116 when in shadows. Note that the two thresholds 122, 124 intersect because some of the colors reflected from the surface of the roadway in cloudy sunlight are the same as those colors reflected when the road is in shadows. The significant point illustrated is that a very small change in color parameters occurs in the presence of shadows as is indicated by the proximity of the first and second sections of mapped pixels shown in FIG. 4. Conversely, a very large change occurs in intensity information in the presence of shadows.

Figure 5:
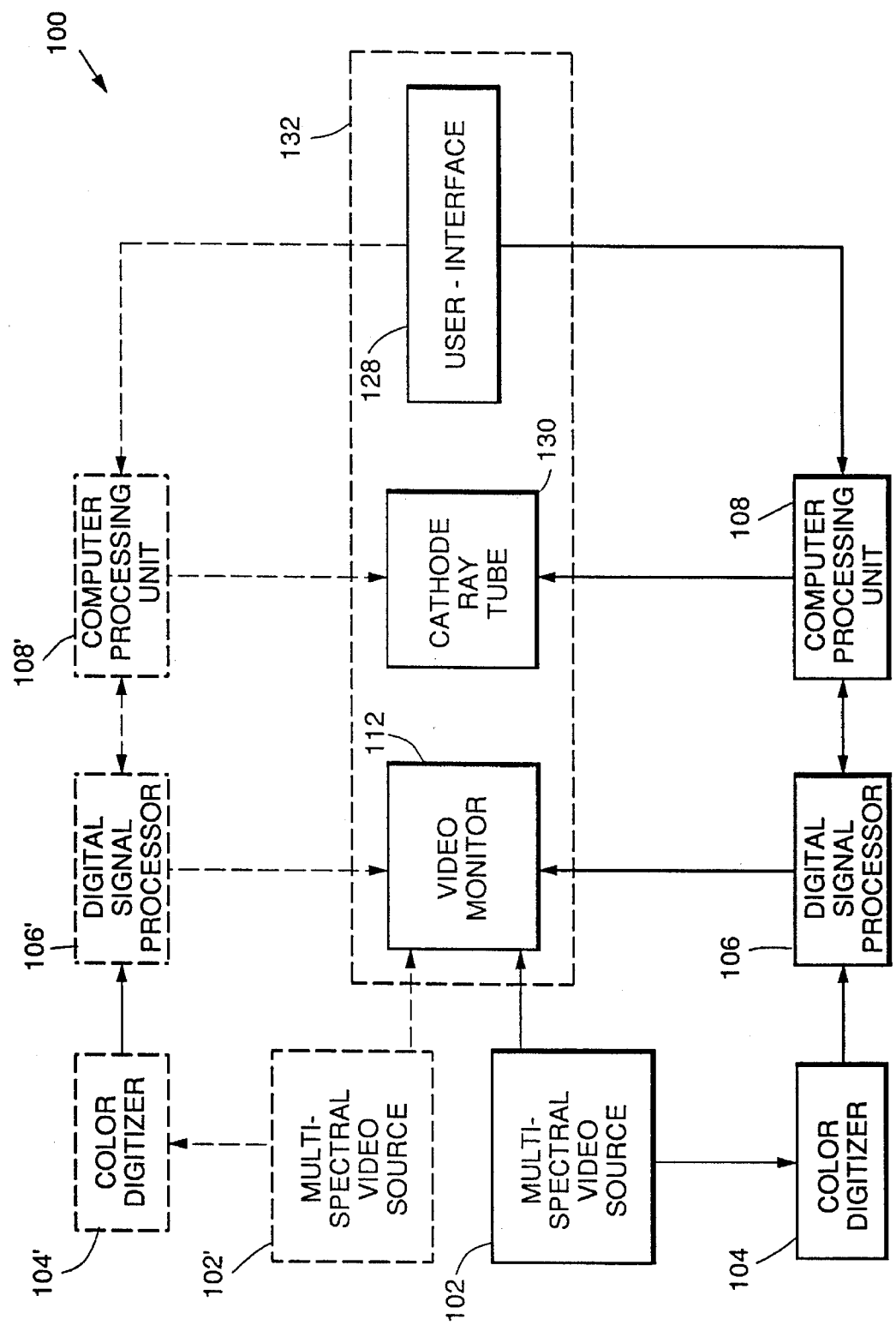
FIG. 5 is a simplified block diagram of a video image processor which employs multi-spectral color information to distinguish vehicles from the roadway.

An example embodiment of the video image processor 100 is shown in FIG. 5. The structural combination of elements includes the multi-spectral video source 102 which is, in the example embodiment, a color video camera. The function of the video source 102 is to generate video images of scenes of interest, such as, traffic intersections for real-time video processing. However, the traffic scenes can also be recorded on a video tape or disk player for subsequent video processing. The video source 102 is interconnected to the color digitizer 104 and the video monitor 112. The video monitor 112 is a television utilized to view the image of the traffic scene which is generated by the video source 102. The video monitor 112 functions in the same manner whether the video image is in real-time or prerecorded. It is noted that the video source 102 can be located several hundred miles away and transmitted to the video monitor 112 or the color digitizer 104 over an appropriate data link.

The color digitizer 104 converts the color video image from an analog form (volts) into color digital samples and stores them in an R,G,B color memory located within the color digitizer. The analog signal generated by the video camera 102 includes color information and the digitizer 104 converts the color video signal into a digital R,G,B signal form that represents color. The digital signal processor 106 reads the R,G,B color memory at chosen video loop locations, averages the raw color samples to produce sixteen output samples per video loop 110, and then converts the R,G,B values of the sixteen samples to YIQ color coordinates values. Thus, the signal processor 106 serves to extract video loop signals and to separate the color and intensity information in the transformation from R,G,B values to YIQ values. The intensity information is not utilized in the method for detecting vehicles.

The digital signal processor 106 also carries out various graphic operations such as superimposing video loop markers and annotating vehicle counts and velocities on the video image 103. In practice, the digital signal processor 106 via the central processing unit 108 and a user interface 128 sends signal instructions to the video monitor 112 to superimpose the video loop positions on the generated video image 103. The signal processor 106 can also direct these signal instructions to other locations via an appropriate data link. The user-interface 128 consists of, for example, a keyboard for issuing commands to the central processing unit 108 and a joystick (mouse) used to size and place the video loop markers onto the video image 103 of the roadway 116. The user-interface 128 permits the establishment and modification of operational parameters of the video image processor 100. In practice, the user-interface 128 is utilized to direct the central processing unit 108 to move the video loop 103 while the processing unit 108 thereafter instructs the digital signal processor 106 to actually change the position of the video loop. The user-interface 128 is also useful in directing the operation of diagnostic software.

The central processing unit 108 functions to control the input/output (I/O) operations of the video image processor 100. Further, the processing unit 108 executes all the processing related to a road color tracker, the color change detection logic, the vehicle detection logic and a statistics generator. Each of these steps are software controlled in the method for processing video images 103 described hereinbelow. A cathode ray tube 130 receives and displays the computed results from the processing step of statistics generation performed within the central processing unit 108. In the alternative, the computed results can be transmitted to other locations via an appropriate data link.

The example embodiment of the video image processor 100 anticipates locating the multi-spectral video source (color video camera) 102, the color digitizer 104, the digital signal processor 106 and the central processing unit 108 in close proximity to the traffic scene of interest. Further, the video monitor 112, the user-interface 128 and the cathode ray tube 130 are intended to be located at a central control center 132 to permit controlling a plurality of color video cameras 102', color digitizers 104', digital signal processors 106' and central processing units 108'. Such a design is clearly indicated in phantom in FIG. 5.

Figure 6:
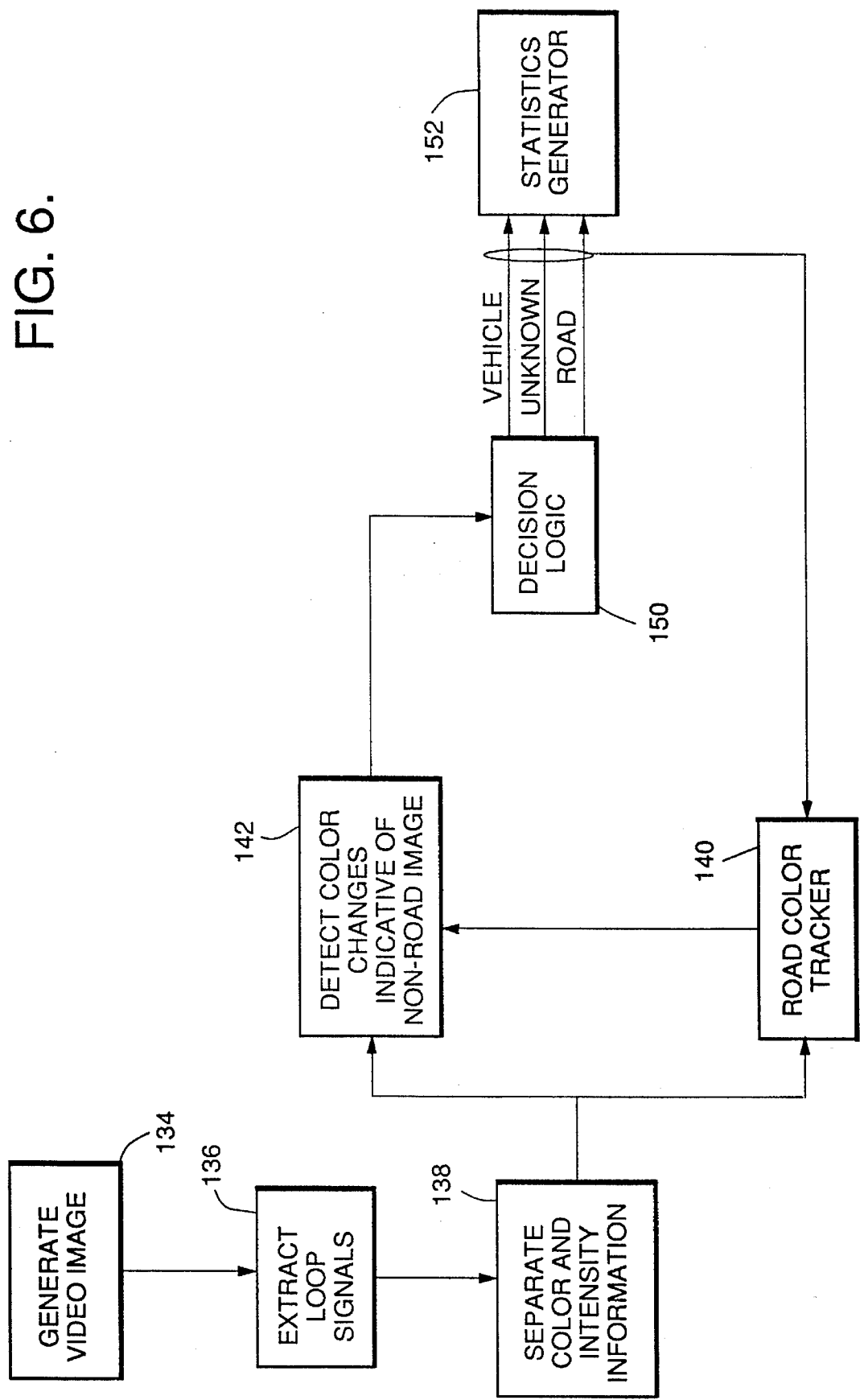
FIG. 6 is a simplified block diagram showing the processing steps associated with the video image processor of FIG. 5 and illustrating the exploitation of the multi-spectral color information within the video image.

The method for processing received video images 103 will now be discussed in accordance with FIG. 6. The initial step 134 in the process is the introduction of the video images 103 generated by the multi-spectral video source 102. For each video loop 110, the color signal is extracted from the loop and converted into digital R,G,B values in step 136 by the color digitizer 104. The intensity information is then separated from the color information in step 138 by transforming the digital R,G,B, values to YIQ values in the digital signal processor 106. During this stage of the process, the intensity component "Y" is discarded and the in-phase (I) and quadrature (Q) components define the two-dimensional color space shown in FIG. 4.

In general, vehicle detection occurs by comparing the present I and Q color coordinates along a given video loop 110 to the expected I and Q color coordinates stored in an accumulation memory in the central processing unit 108 for the surface of the roadway 116 along that video loop 110. If enough of the I and Q color coordinates along a given loop deviate sufficiently from the stored I and Q color coordinates of the roadway surface, a vehicle is potentially crossing the video loop 110. This procedure is accomplished in the following manner.

The determination as to whether a vehicle has passed through a detection point is dependent upon sensing a substantial change in color as compared to the expected stored color for that section of roadway 116. If the expected color of a particular section of the roadway 116 is available in memory, all other colors generated and detected and which are not in memory must be non-roadway colors. A pair of memories located within the central processing unit 108 are available for tracking the color of the roadway 116 in step 140 and for detecting color changes indicative of non-road images in step 142 as shown in FIG. 6. It is emphasized that the two process steps of tracking the roadway color and detecting color changes occur simultaneously.

Figure 4:
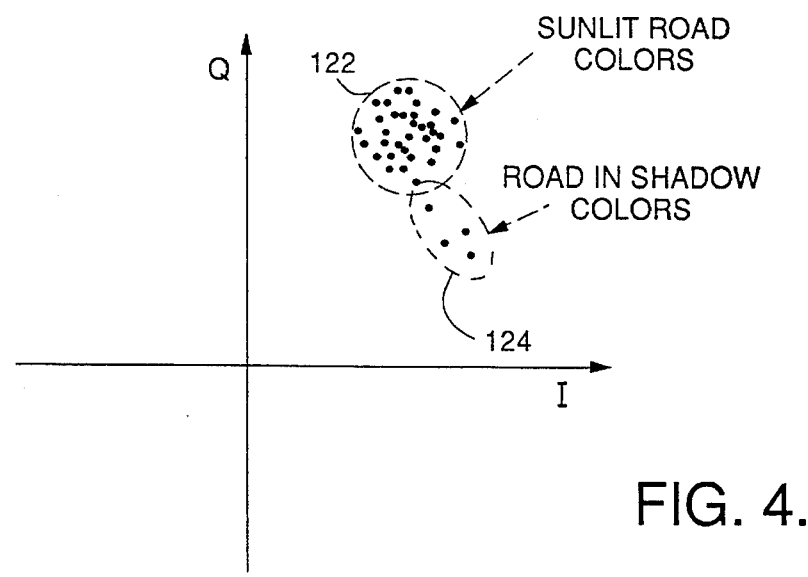
FIG. 4 is a graph showing the two-dimensional color space having a locus of points representing sunlit-road colors and road-in-shadow colors indicating the in-phase and quadrature-phase threshold boundaries.

The threshold 122 of the sunlit road colors and the threshold 124 of the road-in-shadow colors, each shown in FIG. 4, are used to define significant changes in the I and Q color coordinate values. These thresholds are dynamically established by the road color tracker in the central processing unit 108. The color of the roadway 116 along a video loop 110 may change because of the time of day, weather or other atmospheric effects. These color changes tend to be gradual. The road color tracker periodically updates the color profile of the video loop and thus the position of the thresholds 122, 124 so that changes in the loop color are always measured with respect to the present road color.

The road color tracker generates histograms of the I and Q color coordinate values of the roadway surface along each loop. These histograms are analyzed to identify upper and lower bounds for the I and Q values that are typical for the roadway surface along the video loop 110. The I and Q boundaries are filtered over time since the color of the roadway 116 will generally not change rapidly. Once a significant (out of bounds) change in I and/or Q color coordinates is detected, a specified period of time passes for the color to return to expected color values of the roadway 116. A vehicle is declared to be crossing a video loop 110 only after the video loop color profile returns to the expected in-bounds roadway values and after the specified time period following a significant color change detection. The time period is chosen so that the fastest vehicles are unable to pass undetected through the video loop 110 in that period of time. This time gating technique allows the color detection boundaries to be set for high sensitivity to color changes without subsequently causing a high false vehicle detection rate. A vehicle detection has occurred if the video loop color (e.g., mapped pixels 118) moves outside of the I and Q threshold boundaries 122, 124 as shown in FIG. 4.

The color of the roadway 116 is tracked in step 140 in the following manner. The road color tracker comprises an accumulation memory and an accumulation array each of which exist in a small portion of the memory of the central processing unit 108. The road color tracker and color change detector each operate on a per video loop basis. This is the case since each video loop 110 includes a road color tracker and a color change detector which is software controlled within the processing unit 108. This design permits the video image processor 100 to dynamically adapt to atmospheric and other conditions that vary the lighting. During the accumulation step 140, data regarding the color of the roadway 116 is being collected and stored in the accumulation array.

Figure 7:
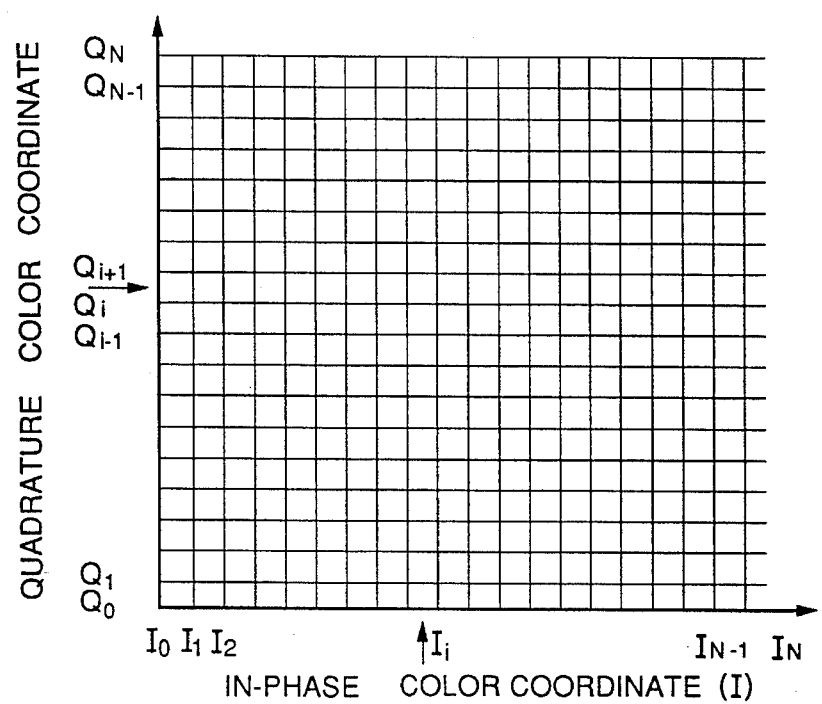
FIG. 7 is a graph showing an accumulation array located within a road tracker of a central processing unit of FIG. 5 and illustrating the memory locations for accumulating background information of the color of the roadway.

The color video camera 102 usually produces video images 103 that exhibit roadway colors since the passage of a vehicle represents a transient event or the section of the roadway 116 is untraveled. For every pixel 118 located in the video loop 110, an I and Q color coordinate value is assigned. In particular, the road color tracker is accumulating the number of times a particular color is detected on the roadway 116. When a particular color is detected, the (I, Q) color information is transmitted to the road color tracker which indexes the data to the accumulation array shown in FIG. 7. The accumulation array is a two-dimensional coordinate system which plots the in-phase color coordinate on the horizontal axis and the quadrature color coordinate on the vertical axis. Each location within the accumulation array represents a combination of (Ii, Qi) coordinates of a color detected on the roadway 116. The analog color coordinates are converted to a location within the accumulation array by mapping, scaling and plotting the (I, Q) values to fit within the array. Whenever an (Ii, Qi) value is identified and stored in the array, a one-count is added to that location in the accumulation memory that represents that (I, Q) color. Data for every pixel in the video loop 110 is stored in the array.

Figure 8:
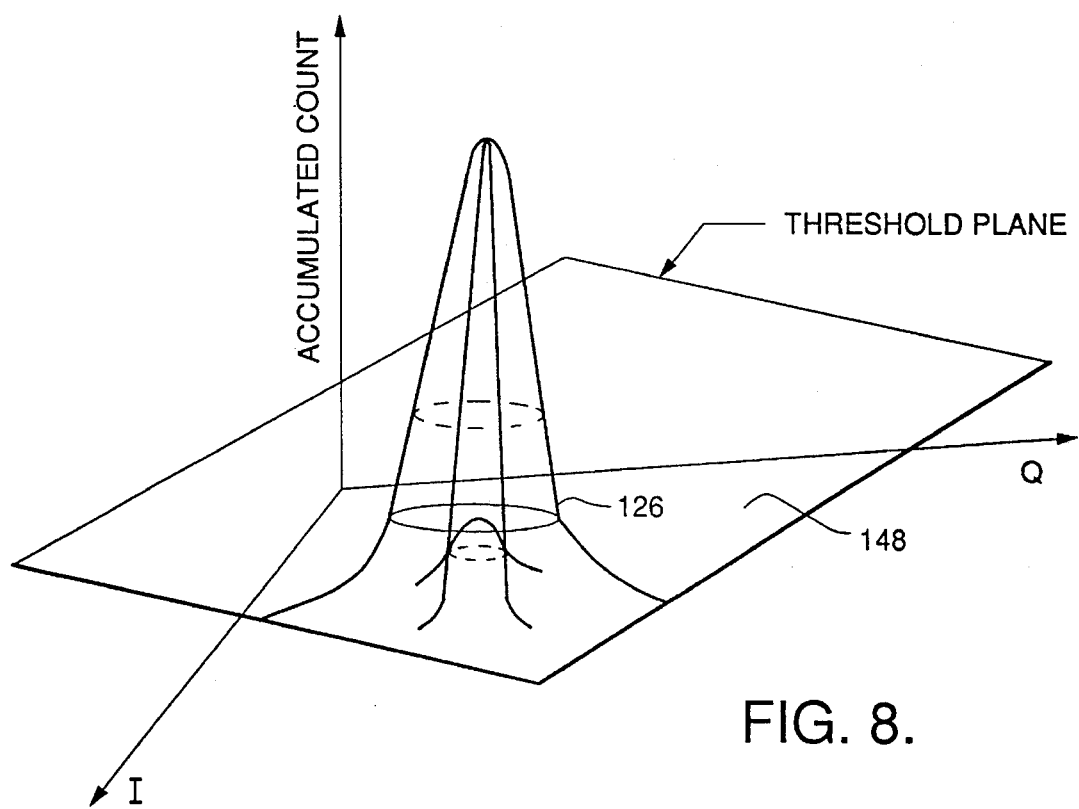
FIG. 8 is a graph showing a three-dimensional color space having the in-phase and quadrature-phase planar coordinates and an accumulated count height coordinate for indicating the frequency of occurrence of color as stored in the accumulation array of FIG. 7.

Over time, a histogram is generated from the (I, Q) data having a large number of counts corresponding to the spectrum of colors appearing on the roadway 116. A typical representation of the accumulated count illustrating the (I, Q) data stored in the accumulation array is shown in FIG. 8. The histogram 146 is a graphical representation of an accumulation of the number of times certain colors were detected on the roadway 116. Thus, the accumulation of information results in a height dimension which is clearly shown in FIG. 8. The height dimension represents the accumulated count of (I, Q) color information and the more often a color occurs, the greater the reading on the accumulated count axis (e.g., z-axis). Thus, higher readings on the accumulated count axis are registered by colors commonly found on bare roadway 116 while lower readings on the accumulated count axis are registered by non-roadway colors. Thus, FIG. 8 is consistent with the illustration of FIG. 4 since the dots representing sunlit road colors and road-in-shadow colors within thresholds 122 and 124, respectively, in FIG. 4 correspond to high counts of roadway colors. Dots outside the thresholds 122 and 124 correspond to low count non-roadway colors.

The road color tracker further determines a threshold value represented by a threshold plane 148 shown in FIG. 8. The threshold plane 148 acts as a dividing line between high and low readings along the accumulated count (height dimension) of FIG. 8. Generally, all values or readings above the threshold plane 148 are deemed to be roadway (I, Q) color coordinates while all values or readings below the threshold plane 148 are deemed to be non-roadway (I, Q) color coordinates. The practical effect is that after the road color tracker has been initialized and accumulates roadway color data for a predetermined period of time, the accumulation function is complete. The road color data stored in the accumulation array shown in FIG. 7 then becomes available to be scrutinized by the color change detector during the color change detecting step 142. The road color tracker then begins a new accumulation process in a separate portion of the memory in the central processing unit 108.

The color change detector located within the central processing unit 108 now accesses the information stored within the accumulation array. The information stored within the accumulation array in combination with the threshold plane 148 from the road color tracker is utilized in method step 142 to determine if the (I, Q) values of new video images 103 are above or below the threshold plane 148. The (I, Q) values of the pixels 118 from the video loop 110 of a new video image 103 are indexed into the accumulation array to determine if the accumulated count value stored in that array location is above or below the threshold plane 148. If the accumulated count value is above the threshold plane 148, it is a roadway color but if the accumulated count value is below the threshold plane 148, it is a non-roadway color. The important point is that there has been a significant color change.

The step 142 of detecting a color change indicative of a non-roadway color and thus a non-roadway image then submits the color change data to the decision logic in step 150. Simultaneously, the road color tracker is creating another accumulation array in memory for each generated video image 103. The color change detector then awaits a signal from the tracker indicating that the color change detector review the new accumulation array stored in memory for threshold color analysis. This process occurs at the rate of sixty times per second for a plurality of video loops.

The decision logic receives the results of the threshold color analysis and makes several determinations for each video loop 110. Initially, the decision logic of method step 150 indicates which pixels 118 in a particular video loop 110 had significant color changes over time. The decision logic stores this information and then decides if the pixels 118 having significant color changes are sufficient in number and are sufficiently "lumped" or close together to indicate the contiguous body of a vehicle. It is important to determine if the number of pixels 118 with significant color changes is sufficient since an insufficient number of changed pixels would be indeterminable as to the presence of a vehicle. Of course, the absence of changed pixels would indicate the bare surface of the roadway 116.

If the pixels 118 having significant color changes are deemed sufficient in number and are contiguously positioned, the decision logic also inspects for a sequence of candidate video loops 110 to decide if the information is erroneous. The response to this inquiry must be continuous in time to indicate that a vehicle has passed. Finally, the decision logic completes step 150 by utilizing a pair of closely spaced video loops 110 to measure the average velocity of the passing vehicle. Although only a single loop is necessary to count vehicles, a pair of loops is required to ensure the presence of a vehicle. The loops are closely spaced to prevent a passing vehicle from avoiding the velocity measurement by changing traffic lanes.

The decision logic of method step 150 first inspects for dramatic color changes within the first video loop 110 to indicate the present onset of a vehicle. Thereafter, the closely-spaced second video loop is inspected for similar dramatic color changes to indicate the onset of the vehicle. Next, each of the first and second loops, respectively, are inspected to determine if there is a return to typical roadway color information within a finite time period. This process conclusively determines the existence of a passing vehicle and further filters out noise and/or transient information. If the decision logic indicates the continuous presence of a dramatic color change, it is possible that a vehicle is stopped in the traffic lane. Under these conditions, the decision logic signals the road color tracker not to dynamically adjust the color of the roadway to match that of the continuous dramatic color change.

The decision logic associated with method step 150 then transfers the data related to the presence or absence of a vehicle, color change, count, average vehicle velocity and length, and queue length to a statistics generator for compiling the information in method step 152. Further, decision logic information indicating the presence of a vehicle, the absence of a vehicle and thus the presence of roadway colors, or indeterminate color information is also transmitted to the road color tracker via a feedback loop to assist in the road color tracking (accumulating) step 140. The statistics generator of method step 152 compiles the data into a useful format under the control of the central processing unit 108. Thus, information relating to the presence of vehicles, the number of vehicles passing in a specified time period (e.g., traffic density), average vehicle velocity, vehicle length, and the like can then be displayed on the cathode ray tube 130.

The method of processing video images 103 and thus detecting vehicles includes the following flow path. The video images 103 are initially generated and each pixel 118 is assigned an R,G,B color value by the multi-spectral video source 102. The analog R,G,B color value is then converted to digital color data for subsequent signal processing. The following mathematical expressions are representative of the transformation of the R,G,B color values to (YIQ) color coordinates as described in the present invention. Since the intensity information "Y" is discarded, only two expressions exist for the I and Q color coordinates which are $$I = (k_1)R + (k_2)G + (k_3)B \qquad [1]$$

$$Q = (k_4)R + (k_5)G + (k_6)B \quad [2]$$

where the values $k_1$ through $k_6$ are constants and can have the following exemplary values: $k_1=0.596$; $k_2=-0.274$; $k_3=-0.322$; $k_4=0.211$; $k_5=-0.523$; and $k_6=0.312$. After the conversion, the (I, Q) color coordinates must be scaled for placement within the accumulation array of the central processing unit 108. The scaled color coordinates (I', Q') are determined by the expressions $$I' = (a)I + b \quad [3]$$

$$Q' = (a)Q + b \quad [4]$$

where "a" and "b" are variables which are a function of the size of the pixel 118 The (I', Q') color coordinates represent the digital color data extracted from designated areas of the generated video images 103.

The (I', Q') color coordinates represent an address in the accumulation array. The value stored at the address (I', Q') is indicated by the expression L(I', Q') where "L" is symbolic of the accumulation (look-up) array as seen by the color change detector shown in step 142 of FIG. 6. In order to utilize the extracted digital color data (I', Q') for identifying a non-roadway color distinguishable from a background roadway color, the following expressions must be applied $$\text{If } L(I', Q') > \text{Threshold} \rightarrow \text{roadway color} \quad [5]$$

$$\text{If } L(I', Q') < \text{Threshold} \rightarrow \text{non-roadway color} \quad [6]$$

where the threshold is represented by the threshold plane 148 as shown in FIG. 8. If a non-roadway color is indicated (e.g., L(I', Q') < Threshold), then the following requirements must be met.

$$\text{If Number of Pixels with non-roadway color} > N \rightarrow \text{Vehicle} \quad [7]$$

where "N" is some threshold number of pixels and $$\text{If Spacing of N pixels} \leq X \rightarrow \text{Vehicle} \quad [8]$$

where "X" is a maximum threshold spacing distance between pixels, then a vehicle is detected in the video loop 110. Finally, a pair of video loops 110 is employed to confirm the detection of a vehicle.

$$\text{If } L(I', Q') < \text{Threshold for two loops} \rightarrow \text{Vehicle Onset} \quad [9]$$

where non-roadway colors are detected for two closely-spaced video loops 110, and $$\text{If } L(I', Q') > \text{Threshold for two loops} \rightarrow \text{roadway color} \quad [10]$$

where roadway colors are detected for the two closely-spaced video loops 110 immediately following the detection of the non-roadway colors, then the detection of a vehicle is confirmed.

Tests conducted during clear weather have demonstrated a 94% probability of vehicle detection with a 2% false detection probability. Shadows did not trigger any false detections. It is within the spirit and scope of the present invention to incorporate adaptable pattern recognizers such as neutral networks to provide improved performance in distinguishing color changes due to weather effects from color changes due to vehicles. Spatial and temporal filtering such as median filters of the video loop data may also be beneficial in reducing false detections during rain or snow fall.

The present invention discloses a video image processor 100 that utilizes multi-spectral (color) information contained in generated video images 103 to detect vehicles passing through a video loop 110. The video loops 110 superimposed onto the video image 103 function as detection points which are dynamic and which can be placed anywhere in the video image. The process is immune to false vehicle detection caused by shadows and rain spray because the intensity component of the multi-spectral (color) information is discarded. Finally, the process functions during both day and night operations if the vehicle employs head lights and tail lights.

Those skilled in the art will appreciate that any of a plurality of multi-spectral video sources including a multi-spectral infrared video source can be employed to replace the color video camera disclosed in the present invention. Although the exemplary embodiment has been disclosed as a traffic detection device, those skilled in the art will recognize additional uses for the claimed invention. Examples of additional uses include counting objects moving along a conveyor belt in a manufacturing, industrial or agricultural environment, monitoring airplane traffic on taxiways and runways, and surveillance systems for monitoring entrances and exits of structures.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such modifications, applications and embodiments within the scope of the present invention.

Accordingly,

What is claimed is:

1. A method for processing video images, said method comprising the steps of:

generating a plurality of video images with a multi-spectral video source;

converting a plurality of analog color data contained in said generated video images to a plurality of digital color data for subsequent signal processing;

extracting said digital color data from designated areas of said generated video images; and utilizing said extracted digital color data for identifying a color distinguishable from a background color.

2. The method for processing video images of claim 1 further including the step of superimposing an electronic video loop over said generated video images to define said designated areas for extracting said digital color data.

3. The method for processing video images of claim 1 further including the step of separating said digital color data from a plurality of digital intensity data within a digital signal processor and providing said digital color data to a central processing unit.

4. The method for processing video images of claim 1 wherein said step of utilizing said extracted digital color data further includes the step of accumulating a histogram of a plurality of roadway color data within a storage array located within a central processing unit for providing an estimate of background roadway color data.

5. The method for processing video images of claim 1 wherein said step of utilizing said extracted digital color data further includes the step of establishing a threshold value of an accumulated estimate of a plurality of background roadway color data within a storage array located within a central processing unit for distinguishing a roadway color from a non-roadway color within said generated video images.

6. The method for processing video images of claim 1 wherein said step of utilizing said extracted digital color data further includes the step of detecting color changes within said generated video images in a central processing unit when compared to an accumulated estimate of a plurality of background roadway color data.

7. The method for processing video images of claim 1 wherein said step of utilizing said extracted digital color data further includes the step of determining within a central processing unit if a detected color change in a generated video image as compared to an accumulated estimate of a plurality of background roadway color data indicates a color other than said estimated background roadway color data.

8. The method of claim 1 wherein said step of extracting said digital color data further includes the step of processing said digital color data in real-time at the rate of sixty processing iterations per second.

9. A method for processing video images, said method comprising the steps of:

generating a plurality of multi-spectral video images;

superimposing an electronic video loop over said generated video images to define designated areas for extracting color data;

converting a plurality of analog color data contained in said generated video images to a plurality of digital color data for subsequent signal processing;

extracting said digital color data from said designated areas of said generated video images;

separating said digital color data from a plurality of digital intensity data within a digital signal processor and providing said digital color data to a central processing unit; and utilizing said separated and extracted digital color data for identifying a color distinguishable from a background color.

10. A method for detecting the presence of vehicles, said method comprising the steps of:

generating a plurality of multi-spectral video images of a scene;

superimposing an electronic video loop over said generated video images to define designated areas for extracting color data;

converting a plurality of analog color data contained in said generated video images to a plurality of digital color data for subsequent signal processing;

extracting said digital color data from said designated areas of said generated video images;

separating said digital color data from a plurality of digital intensity data within a digital signal processor and providing said digital color data to a central processing unit;

accumulating a histogram of roadway color data within a storage array for providing an estimate of a plurality of background roadway color data;

detecting color changes within said generated video images when compared to said estimate of background roadway color data; and determining if a detected color change in a generated video image indicates a color other than said estimated background roadway color data and the presence of a vehicle.

11. The method for detecting the presence of vehicles of claim 10 wherein said determining step further includes the step of establishing a threshold value of the accumulated estimate of said background roadway color data for distinguishing a roadway color from a non-roadway color within said generated video images.

12. The method for detecting the presence of vehicles of claim 10 further including the step of compiling a plurality of statistical data generated by the central processing unit and displaying said statistical data on a cathode ray tube.

13. A video image processor comprising:

multi-spectral video source means for generating a plurality of video images;

color digitizing means for converting a plurality of analog color data contained in said generated video images to a plurality of digital color data for subsequent signal processing;

processing means for extracting said digital color data from designated areas of said generated video images; and computing means for utilizing said extracted digital color data for identifying a color distinguishable from a background color.

14. The video image processor of claim 13 wherein said multi-spectral video source means comprises a color video camera.

15. The video image processor of claim 13 wherein said processing means comprises a digital signal processor.

16. The video image processor of claim 13 further including a monitoring means for viewing the video image generated by said multi-spectral video source means.

17. The video image processor of claim 13 further including a video display means for displaying the computed results generated by the computing means.

18. The video image processor of claim 13 further including a user interface means for establishing and modifying the operational parameters of the video image processor.

19. The video image processor of claim 18 wherein said user interface means comprises a keyboard.

20. A video image processor for detecting the presence of vehicles comprising:

multi-spectral video source means for generating a plurality of multi-spectral video images;

color digitizing means for converting a plurality of analog color data contained in said generated video images to a plurality of digital color data for subsequent signal processing;

processing means for extracting said digital color data from designated areas of said generated video images and separating said digital color data from digital intensity data contained in said generated video images; and computing means for providing an accumulated estimate of background roadway color data for detecting color changes within said generated video images, said computer means determining if a detected color change indicates a color other than said estimated background roadway color data and the presence of a vehicle.

* * * * *